United States Patent
Su et al.

(10) Patent No.: US 10,545,590 B2
(45) Date of Patent: Jan. 28, 2020

(54) METHOD OF TOUCH PANEL MANUFACTURING WITH STRENGTHENING SHEET DISPOSED IN PERIPHERY AREA AT EDGE OF CONNECTING PAD

(71) Applicant: TPK TOUCH SOLUTIONS (XIAMEN) INC., Xiamen (CN)

(72) Inventors: Yuncong Su, Xiamen (CN); Zhuanyuan Zhang, Zhangzhou (CN); Yan Lin, Xiamen (CN); Li Huang, Putian (CN)

(73) Assignee: TPK Touch Solutions (Xiamen) Inc., Xiamen, Fujian (CN)

( * ) Notice: Subject to any disclaimer, the term of this patent is extended or adjusted under 35 U.S.C. 154(b) by 15 days.

(21) Appl. No.: 14/578,509

(22) Filed: Dec. 22, 2014

(65) Prior Publication Data

US 2015/0193066 A1 Jul. 9, 2015

(30) Foreign Application Priority Data

Jan. 6, 2014 (CN) .......................... 2014 1 0004409

(51) Int. Cl.
*G06F 3/041* (2006.01)

(52) U.S. Cl.
CPC .. *G06F 3/0412* (2013.01); *G06F 2203/04103* (2013.01); *Y10T 29/49155* (2015.01)

(58) Field of Classification Search
CPC ........ G06F 3/041; G06F 3/0412; G06F 3/044; G06F 3/047; G06F 2203/04103; G06F 3/0416; G06F 3/0443; G06F 3/0445; G06F 3/0446; G06F 3/045

USPC ..................................... 345/173–179
See application file for complete search history.

(56) References Cited

U.S. PATENT DOCUMENTS

| | | | | |
|---|---|---|---|---|
| 6,232,662 | B1 * | 5/2001 | Saran ..................... | H01L 24/03 257/734 |
| 9,383,875 | B2 * | 7/2016 | Lin ......................... | G06F 3/044 |
| 2002/0074566 | A1 * | 6/2002 | Ker ......................... | H01L 22/32 257/200 |
| 2002/0115280 | A1 * | 8/2002 | Lin ......................... | H01L 24/05 438/617 |
| 2003/0218259 | A1 * | 11/2003 | Chesire .................. | H01L 24/05 257/786 |
| 2005/0156906 | A1 * | 7/2005 | Chiu ....................... | G06F 3/044 345/173 |
| 2005/0219230 | A1 * | 10/2005 | Nakayama ............. | G06F 3/016 345/173 |
| 2006/0081816 | A1 * | 4/2006 | Brabec .................. | C08G 61/126 252/500 |
| 2010/0103119 | A1 * | 4/2010 | Huang ................... | G06F 3/0412 345/173 |
| 2011/0134052 | A1 * | 6/2011 | Tsai ........................ | G06F 3/044 345/173 |
| 2011/0134056 | A1 * | 6/2011 | Kim ....................... | G06F 3/0412 345/173 |

(Continued)

*Primary Examiner* — Amit Chatly
*Assistant Examiner* — Nelson Lam
(74) *Attorney, Agent, or Firm* — Cooper Legal Group, LLC

(57) ABSTRACT

A touch panel includes a substrate, at least a connecting pad and at least a strengthening sheet. The substrate has a display area and a periphery area around the display area. The connecting pad is disposed in the periphery area. The strengthening sheet is disposed in the periphery area and at an edge of the connecting pad.

19 Claims, 14 Drawing Sheets

(56) References Cited

U.S. PATENT DOCUMENTS

| | | | |
|---|---|---|---|
| 2011/0147873 A1* | 6/2011 | Fukuda | G11B 7/13 257/434 |
| 2011/0291994 A1* | 12/2011 | Kwak | G06F 3/045 345/176 |
| 2012/0081300 A1* | 4/2012 | Chan | G06F 3/044 345/173 |
| 2012/0113042 A1* | 5/2012 | Bayramoglu | G06F 3/044 345/174 |
| 2013/0038542 A1* | 2/2013 | Kim | G06F 3/041 345/173 |
| 2013/0112984 A1* | 5/2013 | Kim | H01L 51/0096 257/72 |
| 2013/0335345 A1* | 12/2013 | Liu | G06F 3/041 345/173 |
| 2014/0015789 A1* | 1/2014 | Yeh | G06F 3/044 345/174 |
| 2014/0048398 A1* | 2/2014 | Jiang | H01H 13/86 200/5 A |
| 2014/0055383 A1* | 2/2014 | Kim | G06F 3/041 345/173 |
| 2014/0078100 A1* | 3/2014 | Peng | G06F 3/041 345/174 |
| 2014/0184951 A1* | 7/2014 | Yeh | G06F 3/044 349/12 |
| 2015/0268775 A1* | 9/2015 | Yu | H01L 51/56 345/173 |

\* cited by examiner

METHOD OF TOUCH PANEL MANUFACTURING WITH STRENGTHENING SHEET DISPOSED IN PERIPHERY AREA AT EDGE OF CONNECTING PAD

BACKGROUND OF THE INVENTION

This application claims priority to Chinese Application Serial Number 201410004409.0, filed on Jan. 6, 2014, which is herein incorporated by reference.

Field of Invention

The disclosure relates to touch technology and, in particular, to touch panels and manufacture thereof.

Related Art of Invention

In the present electronic product market, portable electronic products, such as PDAs, mobile phones, notebooks and tablet PCs, widely use touch panels as an interface for data communication. As electronic products tend toward lightness, thinness and compactness, conventional input devices, such as keyboards and mice, are expected to be removed in product design. With the drive of demand for user-friendly tablet PCs, the touch panel has become a key component.

In many touch panels, touch electrodes are formed directly on a substrate, and a plurality of metal wires are formed to connect to the touch electrodes. connecting pads ended of the metal wires are coupled with a flexible circuit board to perform signal transmission to the control circuit. In many connecting pads, it is easy for a crack to form between the edge and the main body thereof in subsequent processes (e.g. a coupling process), which affects signal transmission of the touch panel.

SUMMARY OF THE INVENTION

In order to solve the foregoing problem, a touch panel is disclosed that includes a substrate having a display area and a periphery area around the display area. At least a connecting pad is disposed in the periphery area. At least a strengthening sheet is disposed in the periphery area and adjacent to the connecting pad.

In some embodiments, the strengthening sheet and the connecting pad have the same material, which includes molybdenum, aluminum, copper, silver, nickel, gold or their any alloy.

In some embodiments, the touch panel further comprises at least a first transparent connecting pattern which is disposed in the periphery area and between the substrate and the connecting pad. The connecting pad and the adjacent strengthening sheet at least cover the first transparent connecting pattern.

In some embodiments, the touch panel further comprises a light blocking layer disposed in the periphery area and between the substrate and the connecting pad.

In some embodiments, the material of the first transparent connecting pattern can include indium tin oxide (ITO), indium zinc oxide (IZO), aluminum zinc oxide (AZO), nano-silver, carbon nanotube, poly(3,4-ethylenedioxythiophene) poly(styrene sulfonate) (PEDOT:PSS), zinc oxide dopant or their any combination.

In some embodiments, the touch panel further comprises at least a second transparent connecting pattern which is disposed in the periphery area and at least disposed in the gap between the connecting pad and the adjacent strengthening sheet.

In some embodiments, the material of the second transparent connecting pattern can include indium tin oxide (ITO), indium zinc oxide (IZO), aluminum zinc oxide (AZO), nano-silver, carbon nanotube, poly(3,4-ethylenedioxythiophene) poly (styrene sulfonate) (PEDOT:PSS), zinc oxide dopant or their any combination.

In some embodiments, the strengthening sheet doesn't directly contact the connecting pad.

A manufacturing method of a touch panel of the disclosure comprises steps of: providing a substrate having a display area and a periphery area around the display area; and forming at least a connecting pad in the periphery area and forming at least a strengthening sheet at an edge of the connecting pad in the same step.

In some embodiments, the strengthening sheet and the connecting pad have the same material.

In some embodiments, the manufacturing method further comprises a step of: forming a light blocking layer in the periphery area and between the connecting pad and the substrate.

In some embodiments, the manufacturing method further comprises a step of: forming a plurality of first transparent connecting patterns in the periphery area, wherein the connecting pad and the adjacent strengthening sheet cover the first transparent connecting pattern.

In some embodiments, the manufacturing method further comprises a step of: forming a plurality of second transparent connecting patterns in the periphery area, wherein the second transparent connecting pattern is at least disposed in the gap between the connecting pad and the adjacent strengthening sheet.

In some embodiments, the manufacturing method further comprises a step of: forming a plurality of first electrode axes and a plurality of second electrode axes in the display area.

In some embodiments, the first electrode axes, the second electrode axes and the first transparent connecting pattern are formed in the same step.

In some embodiments, the manufacturing method further comprises a step of: forming a plurality of insulating layers in the display area and at the intersections of the first and second electrode axes.

In some embodiments, the manufacturing method further comprises a step of: forming a plurality of bridge structures in the display area and on the insulating layers.

In some embodiments, the bridge structure and the second transparent connecting pattern are formed in the same step.

As mentioned above, in the conventional art, the connecting pad is easy to be broken from its edge or peel off in the subsequent process. So, the technical features of the disclosure comprise the following illustration. A strengthening sheet is disposed adjacent to the connecting pad, and the strengthening sheet can withstand the stress damage of the etching so that the stress can be stopped to the gap between the connecting pad and the strengthening sheet, and therefore the connecting pad can be effectively prevented from being damaged in the subsequent etching process.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE INVENTION

The present disclosure will be apparent from the following detailed description, which proceeds with reference to the accompanying drawings, wherein the same references relate to the same elements.

To be noted, the embodiments shown in the figures are just for the illustrative purpose but not for limiting the scope of the disclosure. The dimensions of the elements can be adjusted according to the requirement or design. Besides, the relation of the position between the elements illustrated herein should be comprehended as the relative position thereof and, in other words, the structure can be reversed yet to show the same features. These are all included in the scope of the disclosure.

Figure 1:
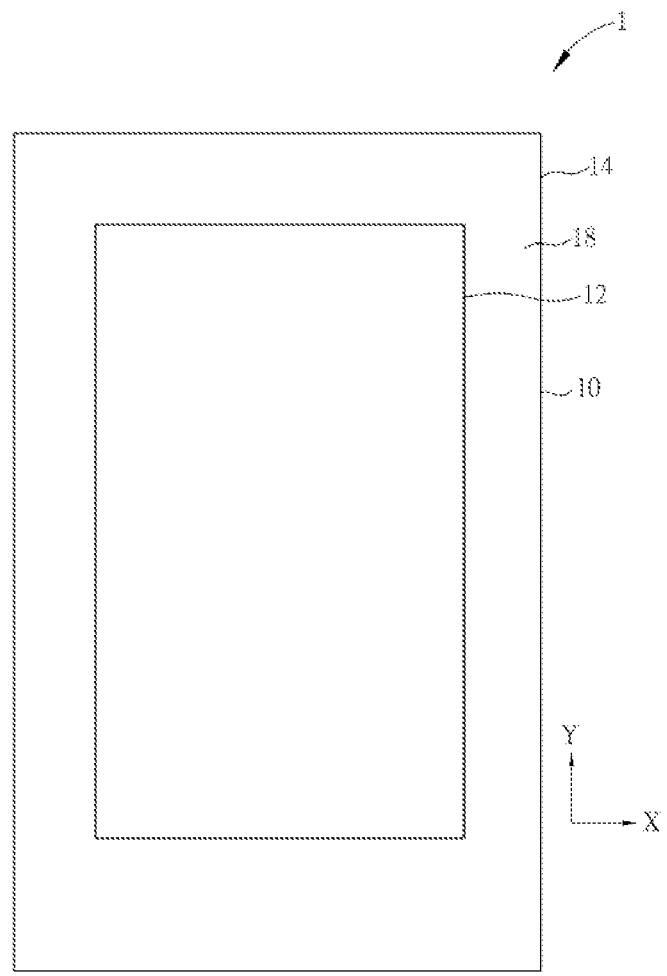
FIGS. 1, 2A, 3A, 4 and 5A are schematic top-view diagrams showing the steps of the manufacturing method of the touch panel according to one or more embodiments.

FIGS. 1 to 5B are schematic top-view diagrams of the manufacturing method of the touch panel according to one or more embodiments. As shown in FIG. 1, a substrate 10 is provided, which can include transparent materials, such as glass, polycarbonate (PC), polyethylene terephthalate (PET), polymethylmesacrylate (PMMA), polysulfone (PES) or cyclic olefin copolymer, or the like, and can be an inflexible or flexible substrate. The substrate 10 has a display area 12 and a periphery area 14 around the display area 12.

As shown in FIG. 1, in some embodiments where the touch panel employs a touch on lens (TOL) structure, for example, a light blocking layer 18 is formed in the periphery area 14 and can optionally include at least a hollowed-out pattern (not shown). In some embodiments, the light blocking layer 18 can include colored (e.g. black) photoresist material, colored ink or other kinds of opaque material, and can be formed in the periphery area 14 by a printing method. The hollowed-out pattern is, for example, a key pattern of a conventional touch panel or a trademark, and can be formed on the light blocking layer 18 by etching, but this disclosure is not limited thereto.

Figure 2A:
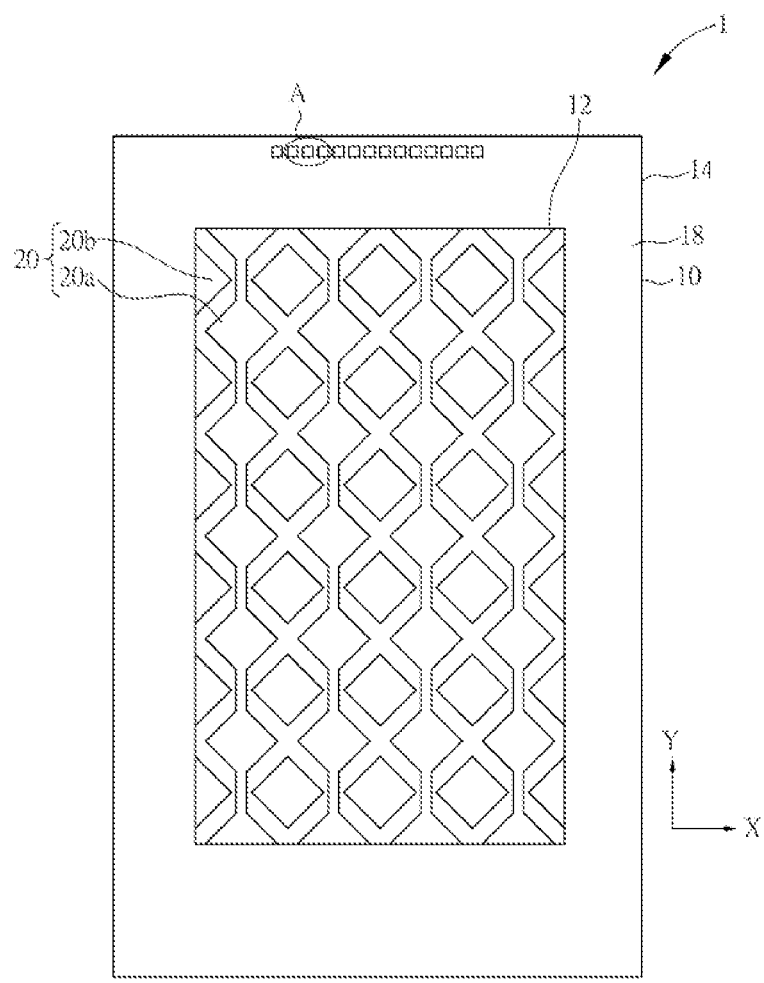

As shown in FIG. 2A, a patterned touch electrode layer 20 is formed in the display area 12. In some embodiments, the patterned touch electrode layer 20 includes a plurality of first electrode axes 20a parallelly arranged along a first direction (Y direction in FIG. 2A) and a plurality of second electrode axes 20b parallelly arranged along a second direction (X direction in FIG. 2A). In FIG. 2A, each of the second electrode axes 20b has not yet been connected into a continuous electrode axis; this will be accomplished by a bridge structure formed in a subsequent process. To be noted, discontinuous first electrode axis 20a and continuous second electrode axis 20b also can be formed, and the subsequent bridge structure will connect each of the first electrode axes 20a. The patterned touch electrode layer 20 includes transparent conductive material, such as indium tin oxide (ITO), indium zinc oxide (IZO), aluminum zinc oxide (AZO), nano-silver, carbon nanotube, poly(3,4-ethylenedioxythiophene) poly (styrene sulfonate) (PEDOT:PSS), zinc oxide dopant or a suitable combination thereof. In some embodiments, the patterned touch electrode layer 20 is formed in the display area 12 by sputtering, electroplating, printing, spin coating or other methods.

Figure 2B:
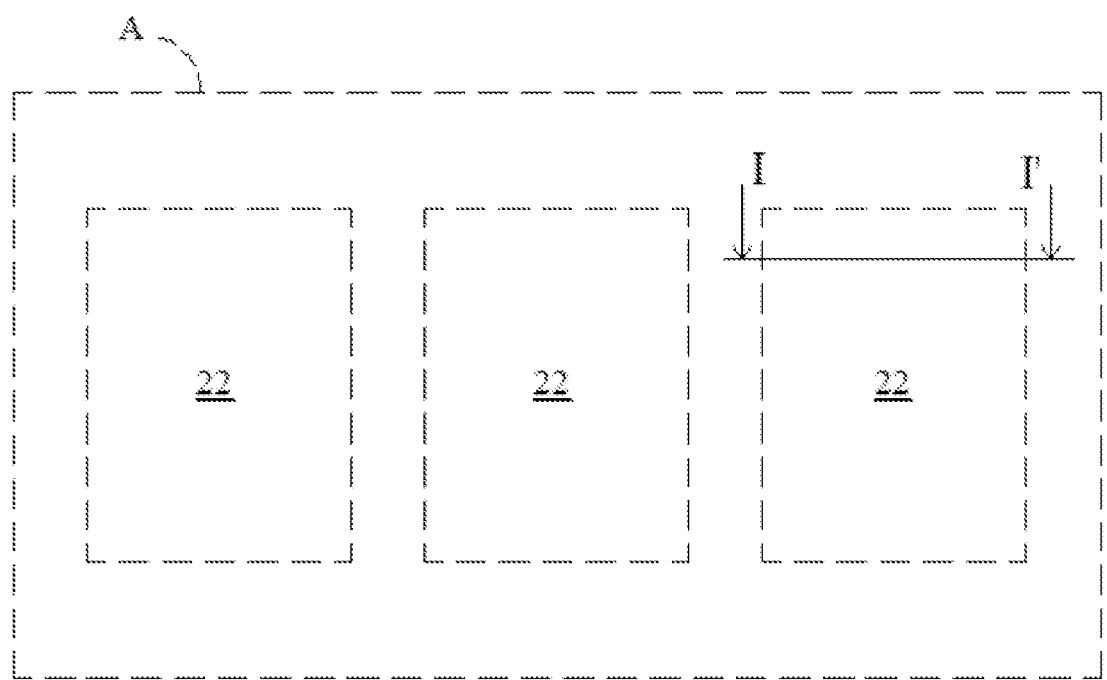
FIG. 2B is a schematic enlarged diagram of the region A in FIG. 2A.
Figure 2C:
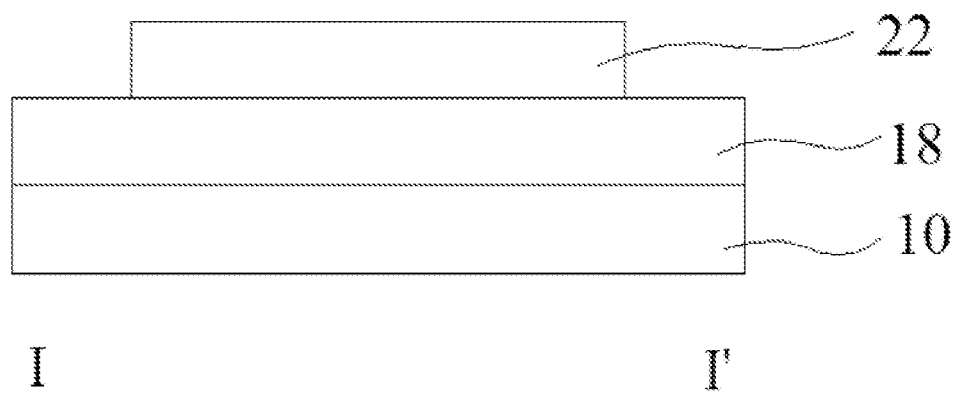
FIG. 2C is a cross sectional view along the line I-I' in FIG. 2B.

In addition to the patterned touch electrode layer 20 formed in the display area 12, in some embodiments, a plurality of first transparent connecting patterns 22 is formed in the periphery area 14 when the patterned touch electrode layer 20 is formed. In some embodiments, the first transparent connecting patterns 22 and the patterned touch electrode layer 20 are formed at the same time, so they have the same material which is transparent conductive material herein. In some embodiments, the first transparent connecting patterns 22 are formed before or after the touch electrode layer, which is also included in the scope of the disclosure. The first transparent connecting pattern 22 is substantially rectangular and disposed in the periphery area 14. The position of the first transparent connecting pattern 22 at least corresponds to the connecting pad and strengthening sheet which are formed in the subsequent process. In some embodiments, the shape of the first transparent connecting pattern 22 is adjusted according to the actual requirement. In some embodiments, when the patterned touch electrode layer 20 and the first transparent connecting pattern 22 are formed, at least a first transparent wire (not shown) is formed in the periphery area 14 to electrically connect to the first transparent connecting pattern 22 and each first or second electrode axis 20a or 20b. The shape of the first transparent wire is about the same as the shape of the metal wire that will be formed later. FIG. 2B is a schematic enlarged diagram of the region A in FIG. 2A. FIG. 2C is a cross sectional view taken along the line I-I' in FIG. 2B. As shown in FIGS. 2B and 2C, the light blocking layer 18 is disposed between the substrate and the connecting pad. Since the adhesion between the first transparent connecting pattern 22 and the light blocking layer 18 is better, the first transparent connecting pattern 22 can be stably formed on the light blocking layer 18 and is uneasy to peel, helping the later formed connecting pad and strengthening sheet to adhere to the light blocking layer 18.

Figure 3A:
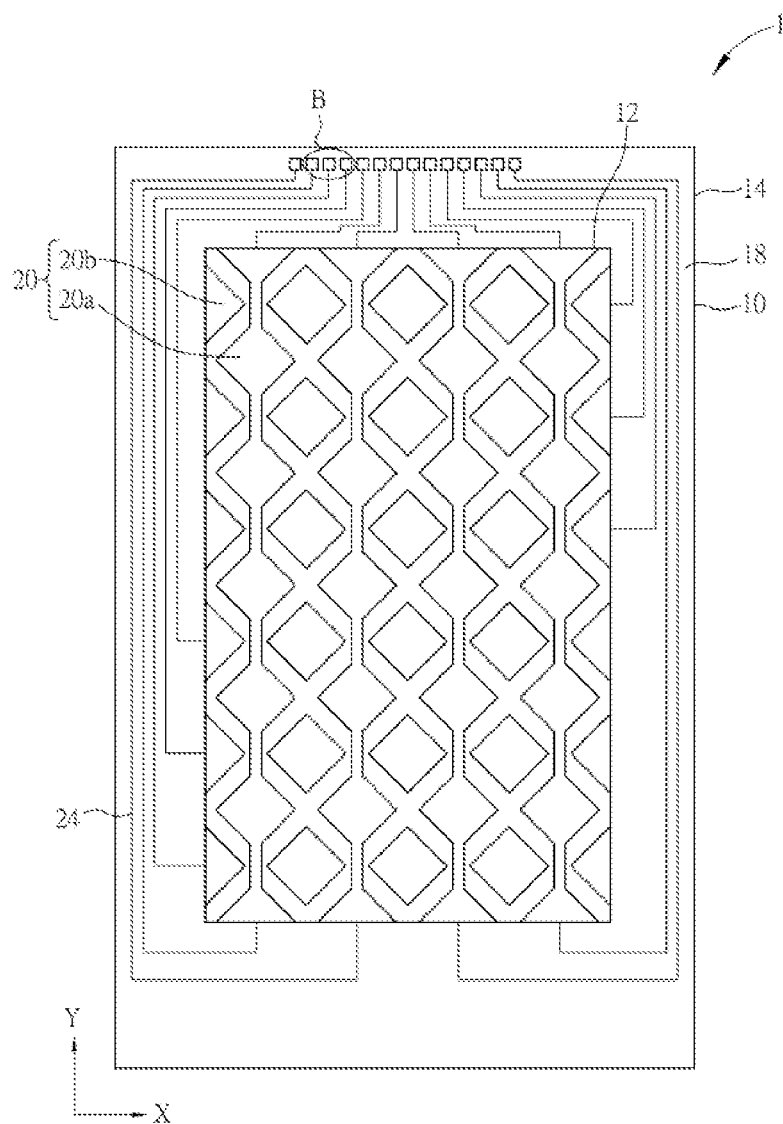

Then, as shown in FIG. 3A, a wire layer is formed in the periphery area 14 and includes a plurality of metal wires 24 and connecting pads 25 which are connected to the metal wires 24. Each of the connecting pads 25 covers the first transparent connecting pattern 22. The metal wires 24 and the connecting pads 25 are formed at the same time. In some embodiments, material of the metal wires 24 includes one or more metals with good conductivity, such as molybdenum, aluminum, copper, silver, nickel, gold, an alloy thereof or the like, without limitation thereto. Since the adhesion between the metal and the first transparent connecting pattern 22 is better, the connecting pad 25 is stable and difficult to peel away when formed on the first transparent connecting pattern 22 than when formed on the light blocking layer 18. In some embodiments, each of the metal wires 24 is formed on the corresponding first transparent wire to enhance stability thereof in the touch on lens (TOL) structure.

Figure 3B:
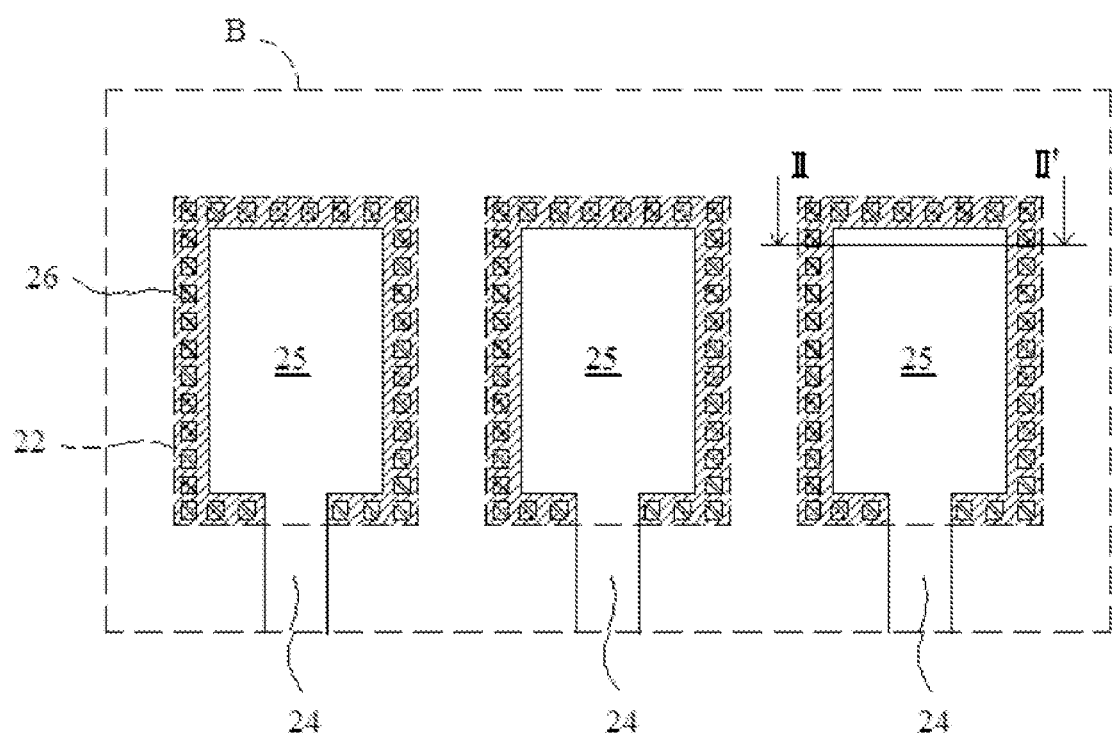
FIG. 3B is a schematic enlarged diagram of the region B in FIG. 3A.
Figure 3C:
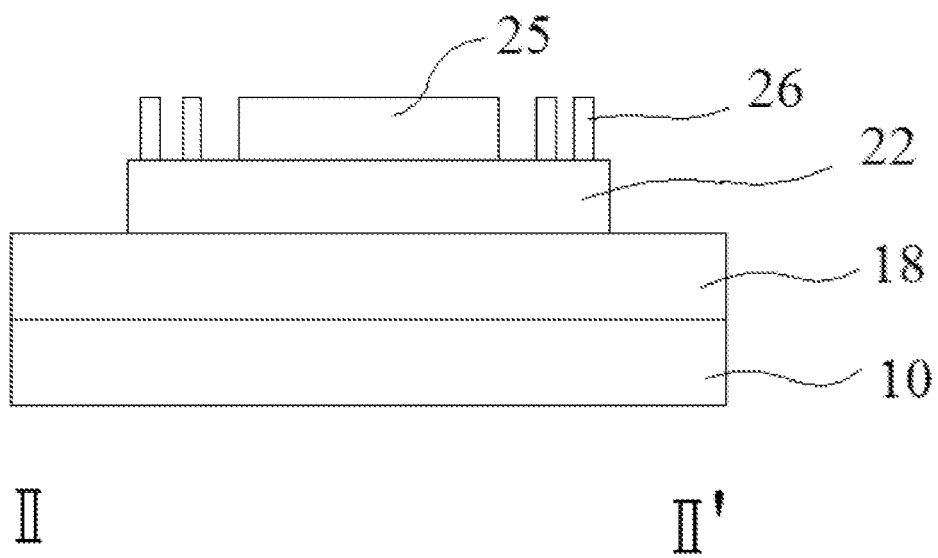
FIG. 3C is a cross sectional view along the line II-II' in FIG. 3B.

FIG. 3B is a schematic enlarged diagram of the region B in FIG. 3A. FIG. 3C is a cross sectional view taken along the line II-II' in FIG. 3B. As shown in FIGS. 3B and 3C, in the periphery area 14, the connecting pad 25 is formed and covers the first transparent connecting pattern 22. Besides, when the metal wire 24 and the connecting pad 25 are formed, at least a strengthening sheet 26 is also formed adjacent to the connecting pad 25 and arranged at the edge of the connecting pad 25. The strengthening sheet 26 is also disposed on the first transparent connecting pattern 22 and can have the same material as the connecting pad 25, such as molybdenum, aluminum, copper, silver, nickel, gold or their any alloy. Although the subsequent process, in which the connecting pad 25 is coupled with a flexible circuit board (not shown) for example, may cause a certain level of damage to the edge of the connecting pad 25 to induce a break from the edge to the main body of the connecting pad 25 and a breakdown of the touch function, the strengthening sheets 26 arranged on at least a part of the edge of the connecting pad 25 will first withstand the damage of the coupling stress so that the main body of the connecting pad 25 is protected. In this embodiment, the strengthening sheet 26 is favorably shaped like a triangle to have a higher structural strength so as to withstand more damage due to the etching. However, this disclosure is not limited thereto. The strengthening sheet 26 also can have other shapes and can be disposed at the edge of the connecting pad 25. To be noted, although the strengthening sheet 26 is disposed at a part of the edge of the connecting pad 25, it doesn't directly contact the connecting pad 25, and there is at least a gap between them. Moreover, since the first transparent connecting pattern 22 is formed optionally, so if the first transparent connecting pattern 22 is not formed in an embodiment, the connecting pad 25 and the strengthening sheet 26 can be directly formed on the light blocking layer 18. Otherwise, when the touch panel is not the TOL structure, the connecting pad 25 and the strengthening sheet 26 can be directly formed on the substrate 10.

Figure 4:
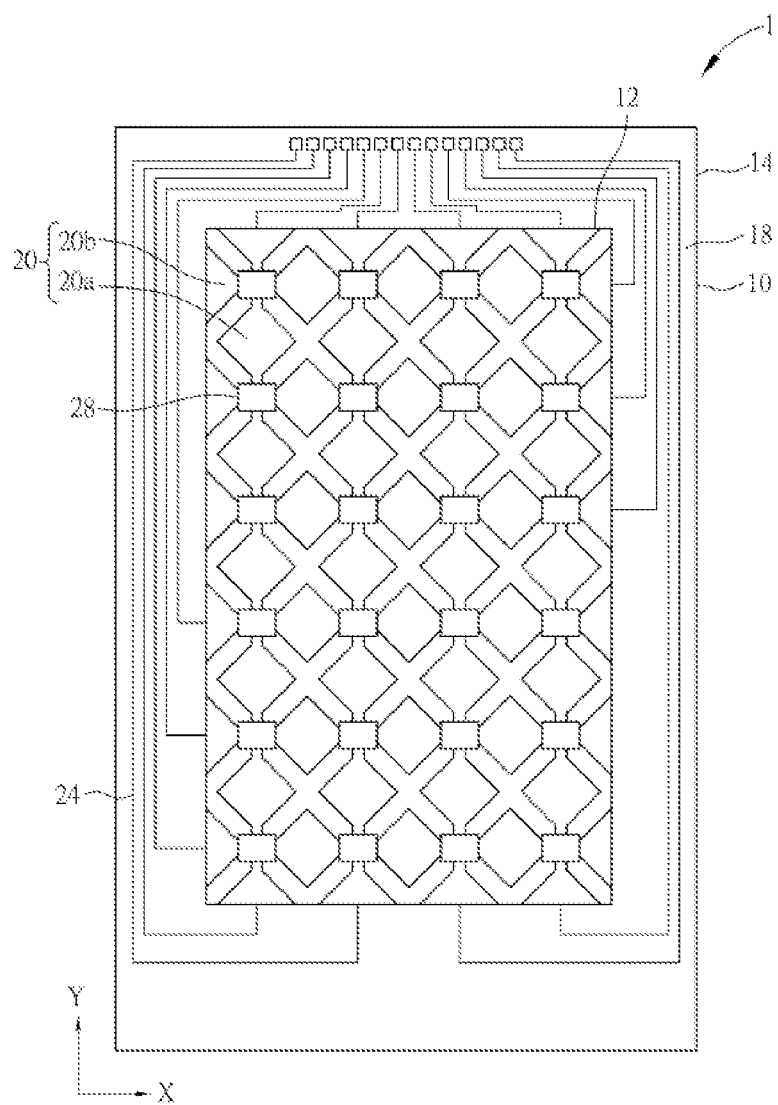

Then, as shown in FIG. 4, a plurality of insulating layers 28 are formed in the display area 12 and mainly disposed at the intersections of the first and second electrode axes 20a and 20b. When the bridge structure (not shown) is formed subsequently to connect the second electrode axes 20b, the insulating layer 28 can electrically separate the first electrode axis 20a from the second electrode axis 20b so as to prevent their electric interference. The insulating layer 28 can include insulating material, such as polyimide (PI), SiO2, SiN, SiCN or SiC. To be noted, in this embodiment, the metal wire 24, the connecting pad 25 and the strengthening sheet 26 are formed first and then the insulating layer 28 is formed. However, this disclosure is not limited thereto. In other embodiments, the first and second electrode axis 20a and 20b can be formed first, then the insulating layer 28 is formed, and then the metal wire 24 and the strengthening sheet 26 are formed in the periphery area 14. The above steps are also included in the scope of the disclosure.

Figure 5A:
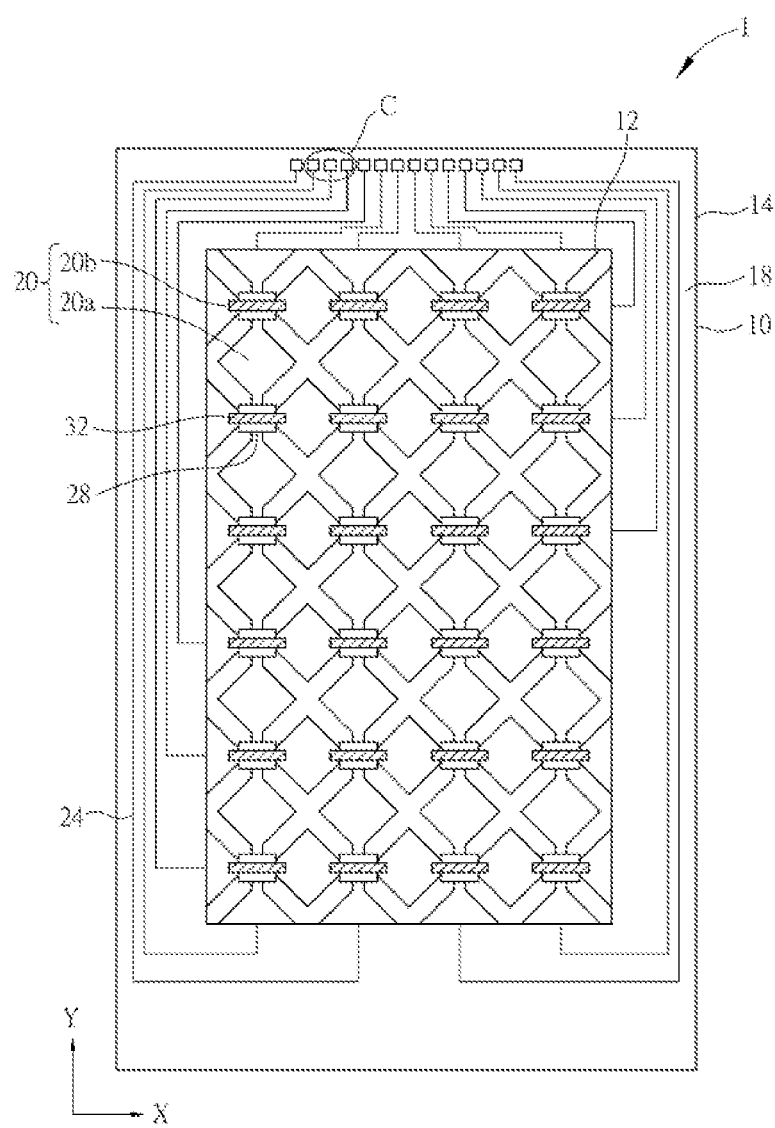

As shown in FIG. 5A, a plurality of bridge structures 32 are formed in the display area 12 to connect each of the second electrode axes 20b so as to form a continuous electrode axis. The bridge structure 32 can include the above-mentioned transparent conductive material or metal. In this embodiment, the bridge structures 32 connect the second electrode axes 20b. However, this disclosure is not limited thereto. In other embodiments, when the patterned touch electrode layer 20 is formed, a plurality of continuous second electrode axes (parallel to the X direction) and a plurality of discontinuous first electrode axes (parallel to the Y direction) can be formed, and then the subsequent bridge structure will connect the first electrode axis into a complete electrode axis. The above illustration is also included in the scope of the disclosure.

Figure 5B:
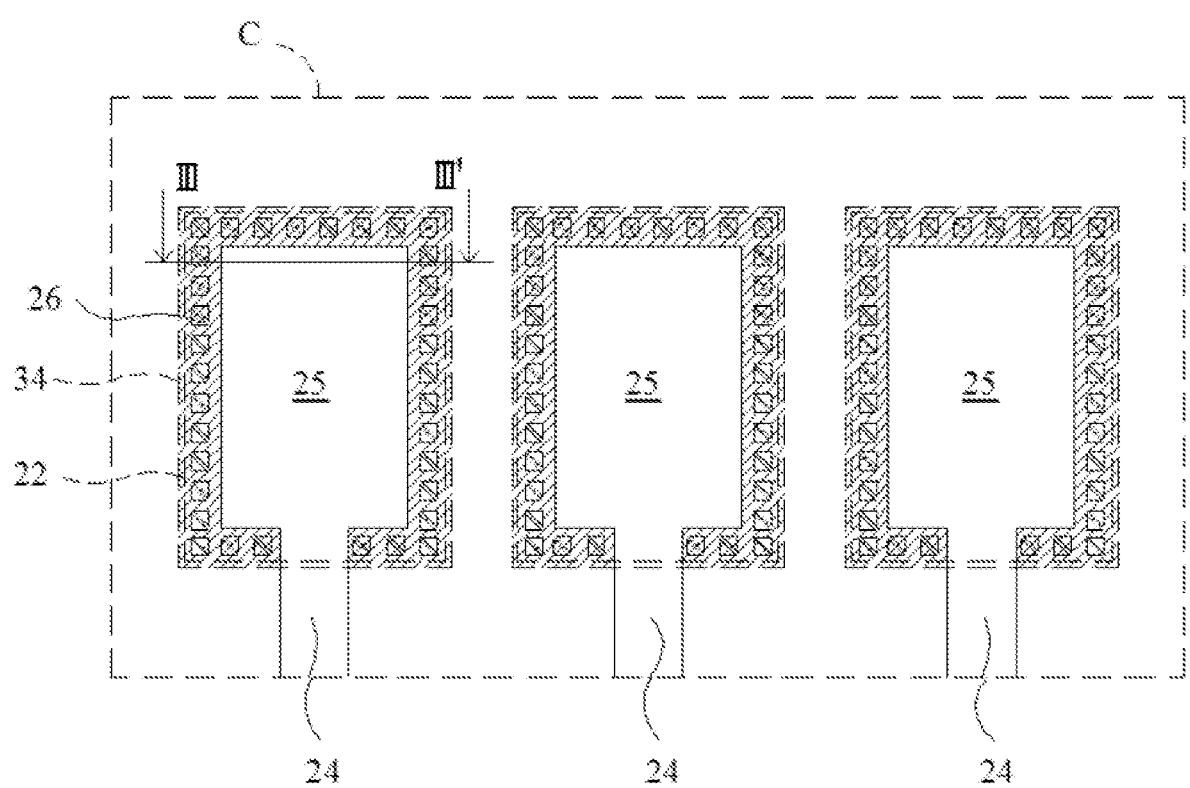
FIG. 5B is a schematic enlarged diagram of the region C in FIG. 5A.
Figure 5C:
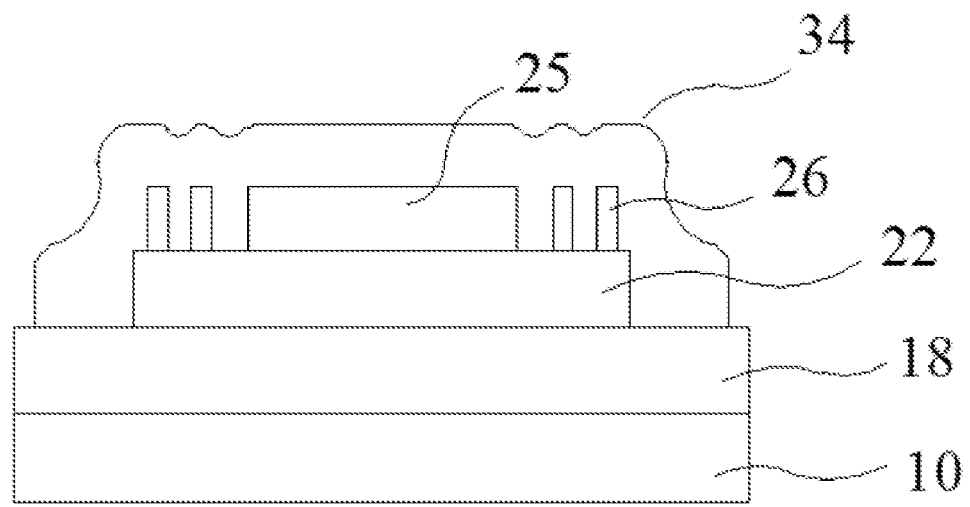
FIG. 5C is a cross sectional view along the line III-3" in FIG. 58.

FIG. 5B is a schematic enlarged diagram of the region C in FIG. 5A. FIG. 5C is a cross sectional view taken along the line III-III' in FIG. 5B. As shown in FIGS. 5B and 5C, when the bridge structure 32 is formed, favorably in this embodiment, a plurality of second transparent connecting patterns 34 are also formed in the periphery area 14 and disposed on the first transparent connecting patterns 22, and at least cover the strengthening sheets 26. Moreover, the second transparent connecting patterns 34 are at least disposed in the gaps between the strengthening sheets 26 and at least disposed in the gaps between the connecting pads 25 and the adjacent strengthening sheets 26. The second transparent connecting patterns 34 can strengthen the adhesion between the connecting pad 25 and strengthening sheet 26 and the substrate 10 or light blocking layer 18 so as to further fix the connecting pad 25 and the strengthening sheet 26. Besides, the second transparent connecting patterns 34 also can be used to electrically connect the strengthening sheet 26 and the connecting pad 25 so as to decrease the whole impedance of the connecting pad 25 when the strengthening sheet 26 and the connecting pad 25 are coupled with an FPC. The second transparent connecting patterns 34 can have the same material as the bridge structure 32. In this embodiment, the second transparent connecting patterns 34 can only be disposed in the gap between the strengthening sheet 26 and the connecting pad 25, also can cover the strengthening sheet 26, and also can optionally completely cover the connecting pad 25. Besides, favorably, the first transparent connecting patterns 22 and the patterned touch electrode layer 20 (especially for the first and second electrode axis 20a and 20b) are formed at the same time and the second transparent connecting patterns 34 and the bride structure 32 are formed at the same time, so the stability of the connecting pad 25 can be enhanced without implementing additional steps. Of course, this disclosure is not limited thereto. In other words, the patterned touch electrode layer 20 and the first transparent connecting pattern 22 can be formed in different steps and the second transparent connecting patterns 34 and the bride structure 32 also can be formed in different steps, so they can have the same or different material. The above illustration is also included in the scope of the disclosure.

Then, the display area 12 and the periphery area 14 are completely covered by a protection layer (not shown), which includes, for example, polyimide (PI), ink, S3N4 or SiO2 as material, to prevent the elements from contacting with the moisture and oxygen in the air and from the damage caused thereby.

The above illustration is for the TOL touch panel as an example and the manufacturing method thereof is also illustrated accordingly, but this disclosure is not only applied to the TOL touch panel but also can be applied to any kind of the touch panel having the connecting pad. In the touch panel with other structures, the light blocking layer 18, the first transparent connecting pattern 22 and the second transparent connecting pattern 34 all can be optionally formed. Besides, the patterned touch electrode layer 20 can be formed not just by the above-mentioned method where the first and second electrode axis 20a and 20b are formed on the same substrate and separated from each other by the insulating layer 28, but also can be formed by another method like that at least a first electrode axis is formed on a substrate and then another substrate having at least a second electrode axis is attached thereon so that the number of the connecting pad formed on a substrate is at least one. Since the related technique is comprehended by those skilled in the art, the related illustration is omitted here for conciseness.

Accordingly, the touch panel 1 at least includes a substrate 10, and the substrate 10 has a display area 12 and a periphery area 14 around the display area 12. At least a wire layer is disposed in the periphery area 14 and includes at least a metal wire 24 and at least a connecting pad 25. Besides, at least a strengthening sheet 26 is disposed at the edge of the connecting pad 25 to enhance the stability of the connecting pad 25 so that the edge of the connecting pad 25 can be prevented from being damaged by the subsequent process. In this embodiment, the strengthening sheet 26 doesn't contact the connecting pad 25, and its shape is favorably a triangle since the triangle has a more stable structure to withstand more damage caused by the etching. However, this disclosure is not limited thereto. The shape of the strengthening sheet 26 can be changed according to the actual requirement. A second transparent connecting pattern 34 can be optionally provided, and is at least disposed in the gap between the connecting pad 25 and the adjacent strengthening sheet 26 so as to further fix the connecting pad 25 and the strengthening sheet 26.

Furthermore, the touch panel 1 further includes a patterned touch electrode layer 20 disposed in the display area 12. The patterned touch electrode layer 20 at least includes a plurality of first electrode axes 20a (arranged parallelly along the Y direction in this embodiment) and a plurality of second electrode axes 20b (arranged parallelly along the X direction in this embodiment). The display area 12 further has a plurality of insulating layers 28 disposed the intersections of the first and second electrode axes 20a and 20b, and has a plurality of bridge structures 32 disposed on the insulating layers 28 and crossing the insulating layers 28 to electrically connect the second electrode axes 20b so that each of the second electrode axes 20b can become a continuous electrode axis (the bridge structures 32 can connect the first electrode axes 20a in another embodiment).

The periphery area 14 of the touch panel 1 can optionally have a plurality first transparent connecting patterns 22, and the connecting pads 25, the strengthening sheet 26 and a part of the metal wires 24 cover the first transparent connecting patterns 22. However, this disclosure is not limited thereto.

A light blocking layer 18 can be optionally formed in the periphery area 14 and on the substrate 10 of the touch panel 1, and therefore the first transparent connecting pattern 22 is disposed on the light blocking layer 28. In other embodiments, however, the light blocking layer 18 may not be formed, so that the connecting pad 25 and the strengthening sheet 26 may be directly formed on the light blocking layer 18 or the substrate 10.

Figure 6A:
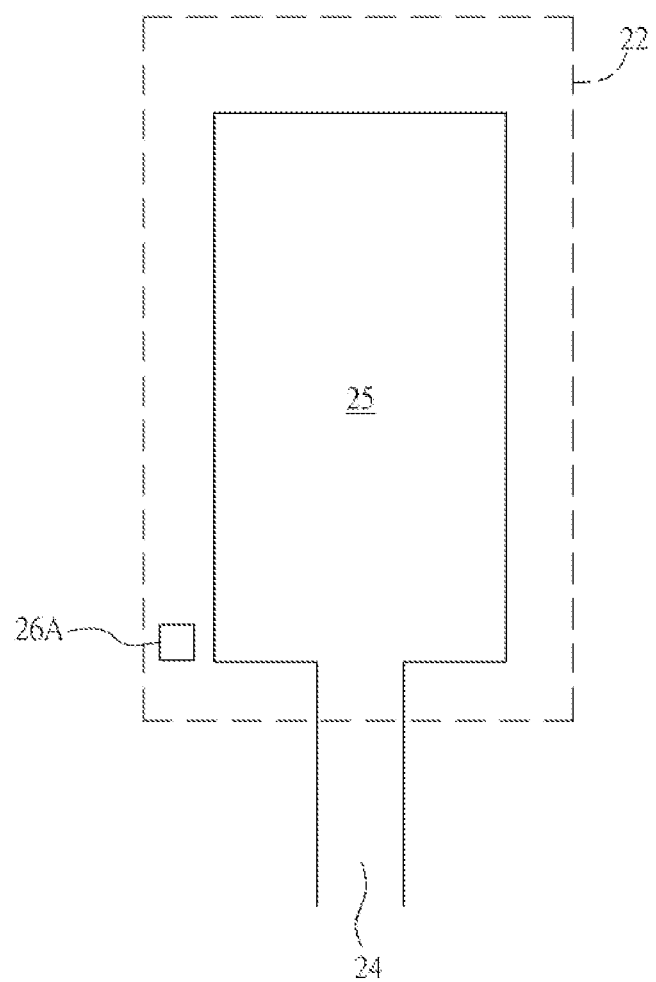
FIGS. 6A to 6C are schematic diagrams of some variations of the strengthening sheet.
Figure 6B:
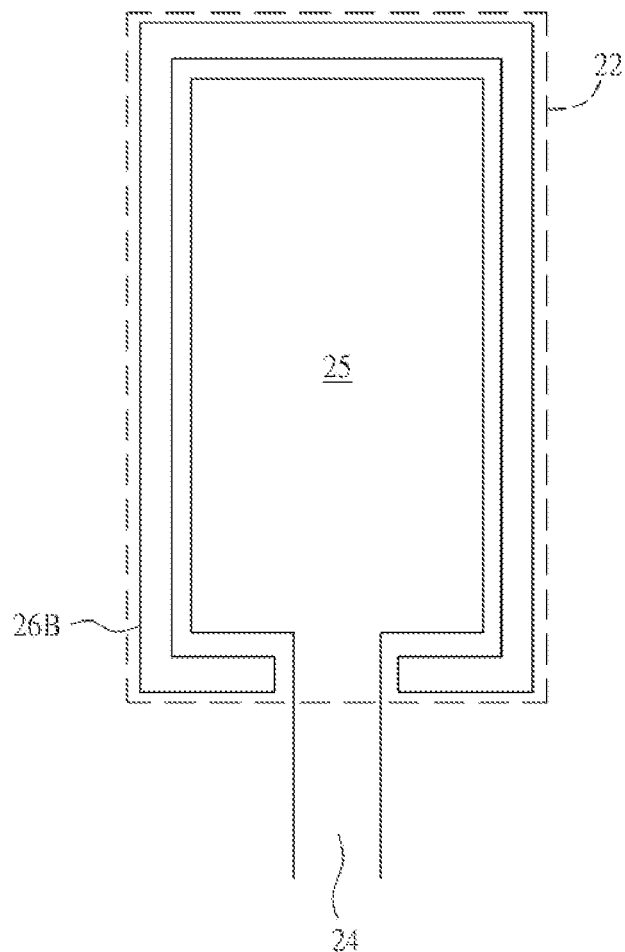
Figure 6C:
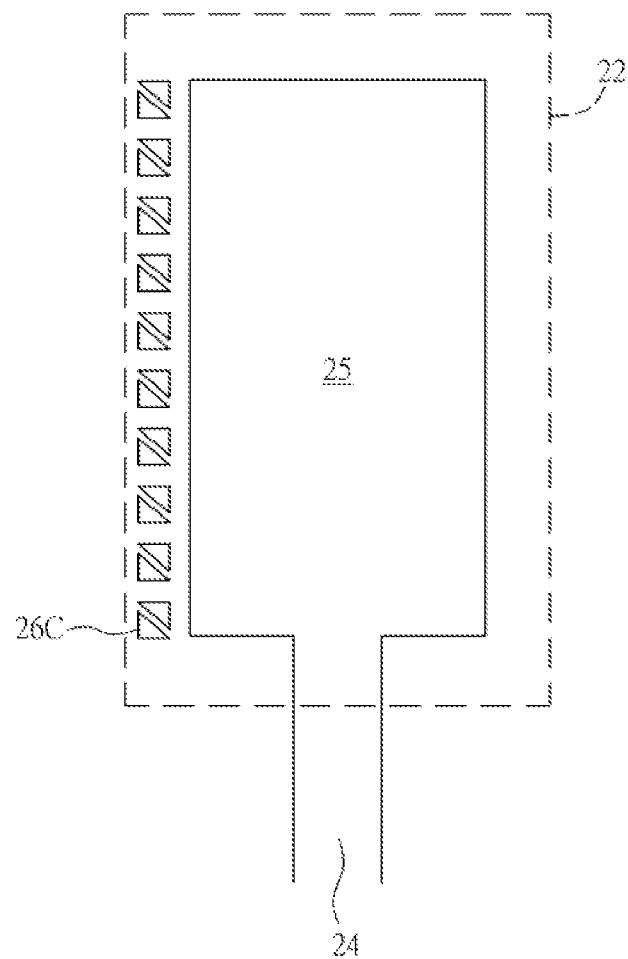

Besides, in addition to the structure shown in FIG. 3B, the strengthening sheet can be embodied otherwise. FIGS. 6A to 6C are schematic diagrams of some variations of the strengthening sheet of the disclosure. As shown in FIG. 6A, the strengthening sheet 26A can be a one-piece and merely disposed on, a side of the connecting pad 25, but, of course, it can be disposed on one or more sides of the connecting pad 25. As shown in FIG. 6B, the strengthening sheet 26B can be a one-piece and surrounds the most portion of the connecting pad 25 except the region of the metal wire 24. As shown in FIG. 6C, the strengthening sheet 26C has the structure similar to the case of FIG. 3B, but is only disposed on a side of the connecting pad 25, and it can be disposed on one or more sides of the connecting pad 25 in other embodiments. The above-mentioned variations of the strengthening sheet 26 are also included in the scope of the disclosure. However, this disclosure is not limited thereto, and the shape or arrangement of the strengthening sheet can be adjusted according to the actual requirement.

The display area 12 and the periphery area 14 can further optionally have a protection layer (not shown) to protect the elements thereunder from contacting with the moisture and oxygen in the air and from the damage cause thereby.

Although the above-mentioned structure of the touch panel and the manufacturing method thereof are illustrated for the TOL touch panel as an example, this disclosure is not limited thereto. This disclosure is also suitable for the touch panels with other structures, such as the single-layer electrode touch panel or double-layer electrode touch panel, as long as at least a strengthening sheet is disposed at the edge of the connecting pad. They are all included in the scope of the disclosure.

To be noted, favorably, the patterned touch electrode layer 20 (especially for the first and second electrode axis 20a and 20b) and the first transparent connecting pattern 22 are formed in the same step, and the bride structure 32 and the second transparent connecting patterns 34 are formed in the same step, so both of them will have the same material, such as the transparent conductive material favorably, to enhance the adhesion of the metal wire 24 in the periphery area 14 without the need of implementing additional steps. However, this disclosure is not limited thereto. The process of the touch panel can be changed according to the actual requirement, so that the patterned touch electrode layer 20 and the first transparent connecting pattern 22 may have different material and the second transparent connecting patterns 34 and the bride structure 32 may have different material, as long as the strengthening sheet 26 is disposed at the edge of the connecting pad 25. They are all included in the scope of the disclosure.

Summarily, the touch panel and the manufacturing method thereof according to the disclosure improve the problem of the conventional art where the connecting pad is easy to be broken or peel off from its edge in the subsequent process. The technical features of the disclosure comprise the following illustration. A plurality of strengthening sheets are disposed adjacent to the connecting pad, and the strengthening sheet can withstand the stress damage of the etching so that the stress can be stopped to the gap between the connecting pad and the strengthening sheet, and therefore the connecting pad can be prevented from being damaged in the subsequent etching process. Besides, this disclosure is not only suitable for the touch panel of the TOL structure but also suitable for any kind of touch panel including the wire.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A touch panel, comprising:
   a substrate having:
      a display area; and
      a periphery area around the display area;
   a first transparent connecting pattern disposed in the periphery area over the substrate, wherein the first transparent connecting pattern is electrically conductive;
   a connecting pad disposed in the periphery area over the first transparent connecting pattern;
   a plurality of strengthening sheets adjacent to the connecting pad, wherein each of the plurality of strengthen sheets is disposed over the first transparent connecting pattern, wherein the plurality of strengthening sheets is positioned around a periphery of the connecting pad to encircle the connecting pad and there is a gap between the connecting pad and each of the plurality of strengthening sheets; and a second transparent connecting pattern electrically connecting the connecting pad and at least one of the plurality of strengthening sheets.

2. The touch panel as recited in claim 1, wherein each of the strengthening sheets and the connecting pad are comprised of a same material, and the material comprises molybdenum, aluminum, copper, silver, nickel, gold or an alloy thereof.

3. The touch panel as recited in claim 1, further comprising:

a light blocking layer disposed in the periphery area between the substrate and the first transparent connecting pattern.

4. The touch panel as recited in claim 1, wherein a material of the first transparent connecting pattern comprises indium tin oxide (ITO), indium zinc oxide (IZO), aluminum zinc oxide (AZO), nano-silver, carbon nanotube, poly(3,4-ethylenedioxythiophene) poly (styrene sulfonate) (PEDOT: PSS), zinc oxide dopant or any combination thereof.

5. The touch panel as recited in claim 1, wherein a material of the second transparent connecting pattern comprises indium tin oxide (ITO), indium zinc oxide (IZO), aluminum zinc oxide (AZO), nano-silver, carbon nanotube, poly(3,4-ethylenedioxythiophene) poly (styrene sulfonate) (PEDOT: PSS), zinc oxide dopant or any combination thereof.

6. The touch panel as recited in claim 1, wherein the second transparent connecting pattern is disposed within the gap.

7. The touch panel as recited in claim 1, wherein there is a second gap between each of the plurality of strengthening sheets.

8. The touch panel as recited in claim 1, wherein the second transparent connecting pattern is disposed over the connecting pad and the at least one of the plurality of strengthening sheets.

9. The touch panel as recited in claim 1, wherein the first transparent connecting pattern electrically connects the connecting pad and at least one of the plurality of strengthening sheets.

10. A manufacturing method of a touch panel, comprising steps of:

providing a substrate having a display area and a periphery area around the display area;

forming a first transparent connecting pattern in the periphery area over the substrate, wherein the first transparent connecting pattern is electrically conductive;

forming a connecting pad in the periphery area over the first transparent connecting pattern;

forming a plurality of strengthening sheets adjacent to the connecting pad, wherein each of the plurality of strengthening sheets is disposed over the first transparent connecting pattern, wherein the plurality of strengthening sheets is positioned around a periphery of the connecting pad to encircle the connecting pad and there is a gap between the connecting pad and each of the plurality of strengthening sheets; and forming a second transparent connecting pattern to electrically connect the connecting pad with at least one of the plurality of strengthening sheets.

11. The manufacturing method as recited in claim 10, wherein each of the plurality of strengthening sheets and the connecting pad are comprised of a same material.

12. The manufacturing method as recited in claim 10, further comprising a step of:

forming a light blocking layer in the periphery area prior to forming the first transparent connecting pattern such that the light blocking layer is between the first transparent connecting pattern and the substrate.

13. The manufacturing method as recited in claim 10, further comprising a step of:

forming a plurality of first electrode axes and a plurality of second electrode axes in the display area.

14. The manufacturing method as recited in claim 13, wherein the plurality of first electrode axes, the plurality of second electrode axes and the first transparent connecting pattern are formed concurrently.

15. The manufacturing method as recited in claim 14, further comprising a step of:

forming a plurality of insulating layers in the display area and at intersections of each of the plurality of first electrode axes and the plurality of second electrode axes.

16. The manufacturing method as recited in claim 15, further comprising a step of:

forming a plurality of bridge structures in the display area and on each of the plurality of insulating layers.

17. The manufacturing method as recited in claim 16, wherein the plurality of bridge structure and the second transparent connecting pattern are formed concurrently.

18. The manufacturing method as recited in claim 10, wherein there is a second gap between each of the plurality of strengthening sheets.

19. A touch panel, comprising:

a substrate having:
  a display area; and
  a periphery area around the display area;

a first transparent connecting pattern disposed in the periphery area over the substrate, wherein the first transparent connecting pattern is electrically conductive;

a connecting pad disposed in the periphery area over the first transparent connecting pattern; and a plurality of strengthening sheets adjacent to the connecting pad, wherein each of the plurality of strengthen sheets is disposed over the first transparent connecting pattern, wherein:

the plurality of strengthening sheets is positioned around a periphery of the connecting pad to encircle the connecting pad and there is a gap between the connecting pad and each of the plurality of strengthening sheets, and the first transparent connecting pattern electrically connects the connecting pad and at least one of the plurality of strengthening sheets.

* * * * *